UNITED STATES PATENT OFFICE

2,199,048

ACYL DERIVATIVES OF AZO DYESTUFFS AND PROCESS OF PREPARING SAME

Charles Graenacher, Riehen, Franz Ackermann, Binningen, and Heinrich Bruengger, Basel, Switzerland, assignors to Society of Chemical Industry in Basle, Basel, Switzerland No Drawing. Application July 11, 1939, Serial No. 283,872. In Switzerland August 17, 1935

12 Claims. (Cl. 260—203)

The present invention relates to a new process for converting into acyl derivatives water-insoluble azo dyestuffs obtained from diazo-compounds and arylides from aromatic hydroxy-carboxylic acids, which acyl derivatives are characterized by an increased solubility in water. This invention comprises the new process, as well as the new acyl derivatives of the insoluble azo dyestuffs from diazo-compounds and arylides from aromatic hydroxy-carboxylic acids.

It has been found that quite generally the water-insoluble azo dyestuffs which are described in the literature in great number and are obtained from diazo-compounds and arylides from aromatic hydroxy-carboxylic acids, can be converted into new acyl derivatives which are characterized by their solubility in water, by causing these water-insoluble azo dyestuffs to react in the presence of tertiary bases with acylating agents which are derived from organic acids containing more than one salt-forming group, which group itself is selected from the group consisting of carboxyl groups and sulfonic groups.

The new products are therefore acyl derivatives of azo dyestuffs which are themselves free from carboxyl groups and sulfonic groups and are characterized by the atomic grouping

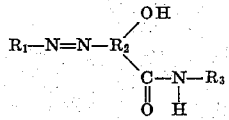

wherein $R_1$ stands for a member of the group consisting of aromatic nuclei of the benzene and of the naphthalene series, $R_2$ stands for the nuclear radical of an aromatic hydroxy-carboxylic acid and $R_3$ stands for a member of the group consisting of aromatic nuclei of the benzene and of the naphthalene series, and wherein the azo-group and the OH-group stand in ortho-position to each other, in which azo dyestuffs the two hydrogen atoms are replaced by the acyl radical of an organic acid which contains more than one salt-forming group from the group consisting of carboxyl and sulfonic groups, which acyl derivatives form alkali salts which are soluble in water with formation of solutions from which the insoluble parent azo dyestuff can be precipitated by treatment with alkalies. These new products are characterized by the solubility of their salts in water, and by the property of regenerating the insoluble parent dyestuffs merely by the action of saponifying agents.

The azo dyestuffs serving as parent materials in the present invention may belong to the series of the mono-, dis- or polyazo dyestuffs. They may be obtained from the diazo-compounds of various amines of the benzene and of the naphthalene series, and it is explicitly pointed out that this expression includes also polynuclear diazotizing bases in which the aromatic nuclei are united to one another by bridges, for example the diphenyl linkage, the

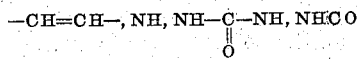

the triazine nucleus or —N=N— linkages. Therefore, such diazotizing bases are also benzidine, dianisidine, 4:4'-diaminodiphenyl urea, monobenzoyl-para-phenylene-diamine, aminoazobenzene, aminobenzene-azo-naphthalene and the like.

As coupling components—arylides of aromatic hydroxy carboxylic acids—may be used for example such components which are derived from aromatic hydroxy-carboxylic acids of the benzene series, for instance the arylides of the phenol-, cresol-, xylenol and chlorocresol-carboxylic acids, and which are constituted in such a manner that they react with diazo-compounds to form ortho-hydroxyazo dyestuffs. Particularly suitable arylides are derived from polynuclear aromatic hydroxy-carboxylic acids. Such arylides are for example the arylides of the 2:3-hydroxynaphthoic acids, of the 1:4-hydroxynaphthalene carboxylic acid or of the 2:3-hydroxyanthracene carboxylic acid; further the arylides of the hydroxycarbazole-carboxylic acids or of the naphthocarbazole-carboxylic acids which are to be regarded as aromatic hydroxy-carboxylic acids, since the OH-group and the COOH-group are linked to aromatic nuclei.

Reference is made moreover to the numerous publications in the literature relating to such arylides and to the insoluble azo dyestuffs derived therefrom further also to the examples and the tabulated summary which follow further below.

Acylating agents deriving from organic acids which contain more than one salt-forming group selected itself from the group consisting of carboxyl groups and sulfonic groups, are for example halides of aliphatic, hydroaromatic or aromatic carboxylic acids which contain sulfonic groups or carboxyl groups. These groups can be transformed after the action of the acylating agents on the dye into water-soluble metal salts or ammonium salts. As examples of acylating agents deriving from organic acids which contain more than one salt-forming group selected itself from the group consisting of carboxyl groups and sulfonic groups, there may be mentioned halides of polycarboxylic acids, such as for example benzene-1:3:5-tricarboxylic acid, benzene hexacarboxylic acid, and polysulfonic acids, such as for example 1:3-benzene-disulfonic acid, 1:3:6-naphthalenetrisulfonic acid: further there are quite particularly suitable halides of sulfo-carboxylic acids in which both the sulfonic group and the carboxyl group are in the form of their halides, and those in which only the sulfonic groups or only the carboxyl groups are in the form of their halides. Examples of such compounds are the halides of the sulfobenzoic acids, of the sulfo-naphthoic acids, of the sulfo-acetic acid, and the like.

The acylation itself is carried out in the presence of a tertiary base which is also preferably used as reaction medium. Among the tertiary bases those are particularly suitable which are heterocyclic tertiary nitrogen bases for instance pyridine, picoline, quinoline, acridine, thiazol, 2:4-dimethylthiazol or benzothiazol, of which the nitrogen atom is a member of the heterocyclic ring to which it is linked by a simple bond, on the one hand, and by a double bond, on the other. For carrying out the reaction the halides of the above mentioned acids or the analogues thereof need not be isolated. On the contrary, the reaction product of a phosphorous halide, such as for example phosphorous trichloride or pentachloride, on the corresponding acids may be used directly. One may also proceed in such a manner that a solution of the azo dyestuff and the polyvalent acid is treated in the tertiary base with phosphorous pentachloride or phosphorous trichloride.

The derivatives obtainable by the invention give valuable transformation products, and can be used for dyeing the most varied materials, for example vegetable fibers, animal fibers, such as wool, silk, leather, or artificial fibers, such as regenerated cellulose or cellulose derivatives, and artificial masses.

They are more or less readily soluble in water. Their aqueous solutions or suspensions may be used for dyeing and printing any desired material in such a manner that the goods, after having been dyed, padded or printed by known processes, are subjected to a saponifying treatment for example with alkalis or agents developing basic substances, such as ammonia, sodium carbonate, caustic soda solution, trisodium phosphate or alkali acetate, whereby the dye initially acylated is fixed as a pigment on the material, and in particular is rendered fast to washing. The saponification of the acylated dyestuffs can also be effected in lacquers and artificial masses. In many cases the treatment with saponifying agents can be applied in the dyeing operation.

If dyes are used which can form metallic complexes, a treatment with a compound yielding a metal can be applied before, during or after the saponification on the fiber, in the dye bath, in lacquers and artificial masses or to the dye in substance, whereby a metalliferous pigment is deposited on the fiber or in the material, or the dye in substance is converted into a metalliferous pigment.

In contradistinction to the soluble acyl derivatives of the leuco-compounds of vat dyes, the derivatives produced by this invention need no oxidizing agent for their development.

The following examples illustrate the invention, the parts being by weight:

*Example 1*

12.6 parts of the azo dye (melting point 262–263° C.) produced by coupling diazotized 1-aminonaphthalene and 2:3-hydroxynaphthoic acid anilide are dissolved by boiling in the necessary quantity of pyridine. The solution is cooled to 80° C. and 19.2 parts of the dichloride of meta-sulfobenzoic acid are poured in. A brown solution is formed. A test portion of the solution, removed even after a short time, does not revert to the parent dye when poured into water, but after stirring gives a perfectly clear solution. After stirring for an hour, the main part of the pyridine is distilled in a vacuum and the residue of the distillation is triturated with a little hot water to remove the more easily soluble products. The washing fluid, after cooling, contains very little of the acylated derivative, and is thrown away, and the radical is again washed with a little water and then dried in a vacuum at 100° C. A solid dark product is obtained which dissolves in water to a brown-red solution. A hot solution of the acylated derivative reverts completely after adding alkali, to the parent dye, which, after recrystallizing from toluol has the original melting point of 262–263° C.

*Example 2*

19.2 parts of 3:5-benzoic acid disulfochloride are added to 100–120 parts of pyridine and 9.2 parts of the axo dye produced by coupling diazotized 4-chloro-ortho-toluidine and 2:3-hydroxynaphthoic acid-2-methyl-4-methoxyanilide are added. After heating quickly to 70–90° C. with thorough stirring the reaction is complete in about 10 minutes and the product is readily soluble in water. The main part of the pyridine is now distilled in a vacuum and the residue of the distillation is dissolved in a little water. By pouring the solution, if desired neutralized with sodium phosphate, into cold saturated brine the product is precipitated after some time, and the pure solid product can be obtained from the solid saline product by extraction with alcohol. It is readily soluble in cold water and reverts to the parent dye on addition of alkali.

*Example 3*

13.2 parts of the meta-sulfonic acid of the benzoylchloride, 80 parts of pyridine and 5.2 parts of the azo dye obtained from 1-aminonaphthalene-4-sulfonic acid and 2:3-hydroxynaphthoic acid anilide are heated together to 80° C. for an hour, whereupon the derivative of the slightly soluble dye dissolves readily in water. The pyridine is then distilled in a vacuum, the residue of the distillation is treated with water and the product is salted out of the aqueous solution. By extracting the precipitate with methyl alcohol the ester of the hydroxyazo dye is obtained in pure form. It is readily soluble in water to a red-brown solution, and reverts to the parent dye on saponification with dilute alkali.

*Example 4*

8.8 parts of benzoic acid-3-sulfochloride and 4.2 parts of the azo dyestuff from diazotized 1-aminonaphthalene and 2:3-hydroxynaphthoic acid anilide are heated together to about 110–120° C. for 1–2 hours in 26 parts of quinoline, while stirring. After this time the bluish red color of the reaction mixture has changed into a yellow brown which is due to the acylation which has taken place. The mixture is then poured into dilute hydrochloric acid whereby the sparingly soluble quinoline salt of the acylation product is precipitated as a brown substance. The aqueous solution is decanted and the residue evaporated to dryness in a vacuum.

The product represents a brown powder which dissolves fairly easily in dilute ammonia to a brown solution. This solution becomes immediately turbid on heating due to the decomposition to the insoluble parent azo dyestuff.

dissolves in dilute ammonia to a brown solution. On heating this solution the insoluble parent azo dyestuff which has been reformed by saponification is again precipitated.

The following table gives the particulars of further products which can be produced by this invention:

| | Azo dyestuff | Acylating agent | Color of aqueous solution |
|---|---|---|---|
| 1 | 1-naphthylamine → 2:3-hydroxynaphthoic acid-anilide | Benzoic acid-3-sulfochloride | Red-brown. |
| 2 | 2:5-dichloraniline → 2:3-hydroxynaphthoic acid-anilide | ....do.... | Orange-red. |
| 3 | ....do.... | Benzoic acid-3:5-disulfochloride | Do. |
| 4 | Aminochloranisol (OCH₃NH₂Cl:1,2,4) → 2:3-hydroxynaphthoic acid-ortho-anisidide. | Benzoic acid-3-sulfochloride | Red. |
| 5 | Nitrotoluidine (CH₃NH₂NO₂:1,2,4) → 2:3-hydroxynaphthoic acid-anilide | ....do.... | Orange. |
| 6 | Aminochloranisol (OCH₃NH₂Cl:1,2,4) → 2:3-hydroxynaphthoic acid-ortho-anisidide. | Benzoic acid-3:5-disulfochloride | Red. |
| 7 | 4-(4'-methyl)-phenoxyacetylamino-2:5-diethoxy-1-aminobenzene → 2:3-hydroxynaphthoic acid-anilide. | Benzoic acid-3-sulfochloride | Brown. |
| 8 | ....do.... | Benzoic acid-3:5-disulfochloride | Do. |
| 9 | 4-benzoylamino-2:5-diethoxy-1-aminobenzene → 2:3-hydroxy-naphthoic acid-anilide. | ....do.... | Do. |
| 10 | 4'-chloro-2-aminodiphenylether-4-carboxylic acid-diethylamide → 2:3-hydroxynaphthoic acid-ortho-anisidide. | ....do.... | Red. |
| 11 | 1-methoxy-2-aminobenzene-4-diethyl-sulfamide → 2:3-hydroxynaphthoic acid-2:4-dimethoxy-5-chloranisidide. | ....do.... | Do. |
| 12 | Chlortoluidine (CH₃NH₂Cl:1,2,4) → 2-hydroxycarbazole-3-carboxylic acid-para-chloranilide. | Benzoic acid-3:5-disulfochloride | Brown. |
| 13 | 2:5-dichloraniline → 2:3-hydroxynaphthoic acid-ortho-anisidide | ....do.... | Orange. |
| 14 | ....do.... | Benzoic acid-3-sulfochloride | Orange-red. |
| 15 | 4:4'-diaminodiphenylcarbamide → 2:3-hydroxynaphthoic acid-anilide | ....do.... | Brown-red. |
| 16 | 4-chlorbenzene-azo-4'-amino-3'-methoxynaphthalene → 2:3-hydroxy-naphthoic acid-anilide. | ....do.... | Brown-black. |
| 17 | 2-methyl-4:4'-diamino-5-methoxy-azobenzene → 2:3-hydroxynaphthoic acid-anilide. | Benzoic acid-3:5-disulfochloride | Red-brown. |
| 18 | 4:4'-diaminodiphenylmethane → 2:3-hydroxynaphthoic acid-anilide | Benzoic acid-3-sulfochloride | Orange-red. |
| 19 | 4:4'-diaminodiphenylether → 2:3-hydroxynaphthoic acid-anilide | ....do.... | Red. |
| 20 | 1-aminonaphthalene → anilide of 2:3-hydroxynaphthoic acid | 1:3:6-naphthalene-trisulfochloride | Brown. |
| 21 | Meta-chloraniline → anilide of 2:3-hydroxynaphthoic acid | Benzene-1:3:5-tricarboxylic acid chloride | Orange. |
| 22 | ....do.... | Benzenehexacarboxylic acid-chloride | Do. |
| 23 | ....do.... | Naphthoic acid-disulfochloride | Do. |
| 24 | 3-chloraniline → anilide of 2:3-hydroxynaphthoic acid | 1:3:6-naphthalene-trisulfonic acid-chloride | Do. |
| 25 | 4-(4'-methyl)-phenoxyacetylamino-2:5-dimethoxy-1-aminobenzene → anilide of 2:3-hydroxynaphthoic acid. | Furane-α:α'-sulfonecarboxylic acid chloride. | Brown. |
| 26 | 2:5-dichloraniline → α-naphtho-carbazole-5-hydroxy-ortho-carboxylic acid-ortho-toluidide. | Benzoic acid 2:5-disulfochloride | Do. |
| 27 | Nitrotoluidine (CH₃.NH₂.NO₂:1,2,4) → α-naphthocarbazole-3-hydoxy-ortho-carboxylic acid-anilide. | ....do.... | Do. |
| 28 | Nitroanisidine (OCH₃.NH₂.NO₂:1.2.4) → 2-hydroxycarbazole-3-carboxylic acid-ortho-toluidide. | Benzoic acid-3-sulfochloride | Do. |
| 29 | Nitroanisidine (NH₂.OCH₃.NO₂:1.2.4) → 2-hydroxycarbazole-3-carboxylic acid-para-chloroanilide. | ....do.... | Do. |
| 30 | 4-chloro-2-amino-1:1'-diphenylether → 4-hydroxydiphenyl-3-carboxylic acid-para-chloranilide. | ....do.... | Do. |
| 31 | Aminonitro-chlorobenzene (NH₂.NO₂Cl:1.2.4) → 3-hydroxydiphenylene-oxide-2-carboxylic acid-4'-chloro-2'-methoxyanilide. | ....do.... | Do. |
| 32 | Nitrotoluidine (NH₂.NO₂.CH₃:1.2.4) → 3-hydroxydiphenylsulfide-2-carboxylic acid-4'-chloro-2'-methoxyanilide. | ....do.... | Do. |
| 33 | 4:4'-diamino-3:3'-dimethoxydiphenyl → anilide of 2:3-hydroxynaphthoic acid. | ....do.... | Do. |
| 34 | 4-aminoazo-benzene → α-naphthylamide of the 2:3-hydroxynaphthoic acid. | ....do.... | Do. |
| 35 | 4'-amino-2-methoxybenzene-azo-naphthalene → β-naphthylamide of the 2:3-hydroxynaphthoic acid. | ....do.... | Do. |
| 36 | Chlorotoluidine (NH₂.CH₃.Cl:1.2.5) → β-naphthylamide of the 2:3-hydroxynaphthoic acid. | ....do.... | Brown-red. |
| 37 | Chlorotoluidine (NH₂.CH₃.Cl:1.2.4) → anilide of the 1:4-hydroxynaphthoic acid. | ....do.... | Red. |
| 38 | Para-nitraniline → anilide of the 1:4-hydroxynaphthoic acid | ....do.... | Do. |
| 39 | 2:5-dichloraniline → 2:3-hydroxynaphthoic acid-3'-benzoylaminoanilide | ....do.... | Do. |
| 40 | 2:5-dichloroaniline → arylide from 2:3-hydroxynaphthoic acid and 5-aminobenzimidazole. | ....do.... | Do. |
| 41 | 2:5-dichloraniline → arylide from 2:3-hydroxynaphthoic acid and 1-amino-4:5-phenylazimidobenzene. | ....do.... | Do. |
| 42 | 4-benzoylamino-2:5-diethoxy-1-aminobenzene → 2:3-hydroxyanthracene carboxylic acid anilide. | ....do.... | Brown. |

Example 5

8.8 parts of benzoic acid-3-sulfochloride and 4.2 parts of the azo dyestuff from diazotized 1-aminonaphthalene and 2:3-hydroxynaphthoic acid anilide are heated together to about 110–120° C. for 1–2 hours in 27 parts of benzothiazol, while stirring. The blue-red color of the reaction mixture changes thereby to a yellow brown due to acylation.

The reaction mixture is then poured into dilute hydrochloric acid whereby the acylation product is precipitated in resinous form as benzothiazol salt which is sparingly soluble in water. The aqueous solution is decanted and the residue dried in a vacuum.

The reaction product is a brown powder which

This application is a continuation-in-part of our application Serial No. 92,244, filed July 23, 1936.

What we claim is:

1. Process for the manufacture of acyl derivatives of azo dyestuffs comprising causing azo dyestuffs which are free from carboxyl groups and sulfonic groups and are obtained from diazo compounds and arylides from aromatic hydroxycarboxylic acid, to react in a medium consisting of a heterocyclic tertiary nitrogen base whose nitrogen atom is a member of the heterocyclic ring to which it is linked by a simple bond, on the one hand, and by a double bond, on the other, with halides of organic acids which contain more than one salt-forming group from the group consisting of carboxyl groups and sulfonic groups.

2. Process for the manufacture of acyl derivatives of azo dyestuffs, comprising causing azo dyestuffs which are free from carboxyl groups and sulfonic groups and are obtained from diazo compounds and arylides from aromatic hydroxy-carboxylic acid, to react in a medium consisting of pyridine, with halides of organic acids which contain more than one salt-forming group from the group consisting of carboxyl groups and sulfonic groups.

3. Process for the manufacture of acyl derivatives of azo dyestuff, comprising causing azo dyestuffs which are free from carboxyl groups and sulfonic groups and are obtained from diazo compounds and arylides from polynuclear aromatic hydroxy-carboxylic acid, to react in a medium consisting of a heterocyclic tertiary nitrogen base whose nitrogen atom is a member of the heterocyclic ring to which it is linked by a simple bond, on the one hand, and by a double bond, on the other, with halides of organic acids which contain more than one salt-forming group from the group consisting of carboxyl groups and sulfonic groups.

4. Process for the manufacture of acyl derivatives of azo dyestuffs, comprising causing azo dyestuffs which are free from carboxyl groups and sulfonic groups and are obtained from diazo compounds and arylides from polynuclear aromatic hydroxy-carboxylic acid, to react in a medium consisting of pyridine, with halides of organic acids which contain more than one salt-forming group from the group consisting of carboxyl groups and sulfonic groups.

5. Process for the manufacture of acyl derivatives of azo dyestuffs, comprising causing azo dyestuffs which are free from carboxyl groups and sulfonic groups and are obtained from diazo compounds and arylides from the 2:3-hydroxy-naphthoic acid, to react in a medium consisting of a heterocyclic tertiary nitrogen base whose nitrogen atom is a member of the heterocyclic ring to which it is linked by a simple bond, on the one hand, and by a double bind, on the other, with halides of a sulfocarboxylic acid.

6. Process for the manufacture of acyl derivatives of azo dyestuffs, comprising causing azo dyestuffs which are free from carboxyl groups and sulfonic groups and are obtained from diazo compounds and arylides from the 2:3-hydroxy-naphthoic acid, to react in a medium consisting of pyridine, with halides of the benzoic-3-sulfonic acid.

7. The acyl derivatives of the azo dyestuffs which are free from carboxyl groups and sulfonic groups and are characterized by the atomic grouping

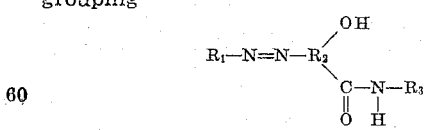

wherein $R_1$ stands for a member of the group consisting of aromatic nuclei of the benzene and of the naphthalene series, $R_2$ stands for the nuclear radical of an aromatic hydroxy-carboxylic acid and $R_3$ stands for a member of the group consisting of aromatic nuclei of the benzene and of the naphthalene series, and wherein the azo-group and the OH-group stand in ortho-position to each other, in which azo-dyestuffs the two hydrogen atoms are replaced by the acyl radical of an organic acid which contains more than one salt-forming group from the group consisting of carboxyl and sulfonic groups, which acyl derivatives form alkali salts which are soluble in water with formation of solutions from which the insoluble parent azo dyestuff can be precipitated by treatment with alkalies.

8. The acyl derivatives of the azo dyestuffs which are free from carboxyl groups and sulfonic groups and are characterized by the atomic grouping

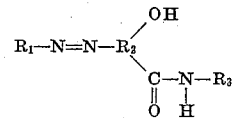

wherein $R_1$ stands for a member of the group consisting of aromatic nuclei of the benzene and of the naphthalene series, $R_2$ stands for the nuclear radical of a polynuclear aromatic hydroxy-carboxylic acid, the azo-group and the

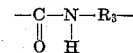

group standing in ortho-position to the OH-group, and $R_3$ stands for a member of the group consisting of aromatic nuclei of the benzene and of the naphthalene series, and in which azo dyestuffs the two hydrogen atoms are replaced by the acyl radical of an organic acid which contains more than one salt-forming group from the group consisting of carboxyl and sulfonic groups, which acyl derivatives form alkali salts which are soluble in water with formation of solutions from which the insoluble parent azo dyestuff can be precipitated by treatment with alkalies.

9. The acyl derivatives of the azo dyestuffs which are free from carboxyl groups and sulfonic groups and are characterized by the atomic grouping

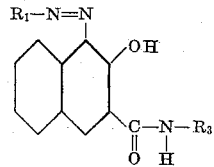

wherein $R_1$ stands for a member of the group consisting of aromatic nuclei of the benzene and of the naphthalene series, and $R_3$ stands for a member of the group consisting of aromatic nuclei of the benzene and of the naphthalene series, and in which azo dyestuffs the two hydrogen atoms are replaced by the acyl radical of an organic acid which contains more than one salt-forming group from the group consisting of carboxyl and sulfonic groups, which acyl derivatives form alkali salts which are soluble in water with formation of solutions from which the insoluble parent azo dyestuff can be precipitated by treatment with alkalies.

10. The acyl derivatives of the azo dyestuffs which are free from carboxyl groups and sulfonic groups and are characterized by the atomic grouping

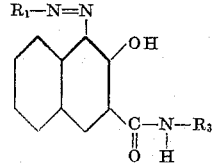

wherein $R_1$ stands for a member of the group consisting of aromatic nuclei of the benzene and of the naphthalene series, and $R_3$ stands for a member of the group consisting of aromatic nuclei of the benzene and of the naphthalene series, and in which azo dyestuffs the two hydrogen atoms are replaced by the acyl radical of a sulfocarboxylic acid which is united with the radical of the azo dyestuff by its C=O-group, which acyl derivatives form alkali salts which are soluble in water with formation of solutions from which the insoluble parent azo dyestuff can be precipitated by treatment with alkalies.

11. The acyl derivatives of the azo dyestuffs which are free from carboxyl groups and sulfonic groups and are characterized by the atomic grouping

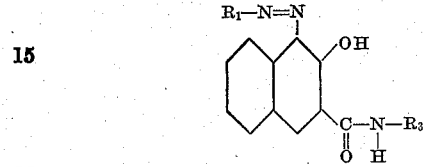

wherein $R_1$ stands for a member of the group consisting of aromatic nuclei of the benzene and of the naphthalene series, and $R_3$ stands for a member of the group consisting of aromatic nuclei of the benzene and of the naphthalene series, and in which azo dyestuffs the two hydrogen atoms are replaced by the acyl radical of a benzene sulfocarboxylic acid which is united with the radical of the azo-dyestuff by its C=O-group, which acyl drivatives form alkali salts which are soluble in water with formation of solutions from which the insoluble parent azo dyestuff can be precipitated by treatment with alkalies.

12. The acyl derivatives of the azo dyestuffs which are free from carboxyl groups and sulfonic groups and are characterized by the atomic grouping

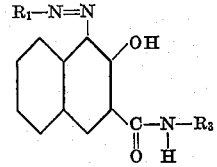

wherein $R_1$ stands for a member of the group consisting of aromatic nuclei of the benzene and of the naphthalene series and $R_3$ stands for a member of the group consisting of aromatic nuclei of the benzene and of the naphthalene series, and in which azo dyestuffs the two hydrogen atoms are replaced by the acyl radical of a benzoic-3-sulfonic acid which is united with the radical of the azo dyestuff by its C=O-group, which acyl derivatives form alkali salts which are soluble in water with formation of solutions from which the insoluble parent azo dyestuff can be precipitated by treatment with alkalies.

CHARLES GRAENACHER.
FRANZ ACKERMANN.
HEINRICH BRUENGGER.